United States Patent Office 3,649,688
Patented Mar. 14, 1972

3,649,688
METHOD FOR THE PREPARATION OF N-3-OXO-HYDROCARBON-SUBSTITUTED ACRYLAMIDES
Joseph Gordon, Beachwood, Ohio, Paul R. Kaufman, Riverside, Calif., and Donald I. Hoke, Chagrin Falls, Ohio, assignors to The Lubrizol Corporation, Wickliffe, Ohio
No Drawing. Filed July 10, 1969, Ser. No. 840,829
Int. Cl. C07c 103/00, 103/56
U.S. Cl. 260—561 N
10 Claims

ABSTRACT OF THE DISCLOSURE

N-3-oxohydrocarbon-substituted acrylamides, especially diacetone acrylamide, are produced in improved yields by a method involving the reaction of 3-oxoalcohols such as diacetone alcohol with an acrylonitrile in the presence of sulfuric acid. According to this method the 3-oxoalcohol is added to a mixture of the nitrile and acid, the latter being of at least 93% concentration, at a temperature below 30° C., and the molar ratio of sulfuric acid to nitrile is at least 1.8:1.

---

This invention relates to a new process for the preparation of N-3-oxohydrocarbon-substituted acrylamides. More particularly, it relates to improvements in a method for the preparation of compounds of the formula

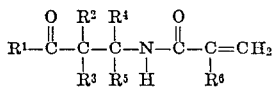

wherein each of $R^1$, $R^2$, $R^3$, $R^4$ and $R^5$ is hydrogen or a hydrocarbon radical and $R^6$ is hydrogen or a lower alkyl radical, by the reaction of a nitrile of the formula

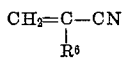

with a 3-oxoalcohol of the formula

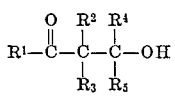

in the presence of sulfuric acid; said improvement comprising (1) preparing a mixture of said nitrile and sulfuric acid, said sulfuric acid being of at least 93% concentration and the molar ratio of said sulfuric acid to said nitrile being at least 1.8:1; (2) introducing into said mixture the 3-oxoalcohol at a temperature below 30° C., and maintaining said temperature during the reaction of said alcohol with said nitrile; and (3) recovering said N-3-oxohydrocarbon-substituted acrylamide from the reaction mixture.

In U.S. Pats. 3,277,056 and 3,425,942, there are disclosed a number of methods for preparing N-3-oxohydrocarbon-substituted acrylamides. One of these methods is the reaction of a β-hydroxy oxohydrocarbon, herein referred to as a 3-oxoalcohol, with acrylonitrile or a substituted acrylonitrile in the presence of sulfuric acid. As disclosed in the first of the above-noted patents, the reaction takes place below about 100° C., preferably about 0–70° C. An example in that patent describes the preparation of N-(1,1-dimethyl-3-oxobutyl)acrylamide, or diacetone acrylamide, by adding a mixture of acrylonitrile and diacetone alcohol to concentrated sulfuric acid and subsequently neutralizing. However, the yield (O.S. yield, as defined hereinafter) in that reaction was only 12% and, in general, reactions of this type afford the desired product only in low yields. Moreover, a number of by-products are obtained in addition to unreacted starting materials. Thus, the reaction of diacetone alcohol with acrylonitrile yields, in addition to the desired diacetone acrylamide, mesityl oxide and acrylamide as well as unreacted diacetone alcohol and acrylonitrile.

Within the past few years it has been found that the N-3-oxohydrocarbon-substituted acrylamides and their polymers have many valuable properties which have promoted great interest in their use in the chemical industry. It has therefore become of importance to develop a suitable method for preparing these compounds in high yields and conversions.

A principal object of the present invention, therefore, is to provide an improved method for the preparation of N-3-oxohydrocarbon-substituted acrylamides.

A further object is to provide a method which affords these acrylamides, especially diacetone acrylamide, in high yields and conversions after relatively short periods of time.

Still another object is to prepare diacetone acrylamide contaminated with a minimum of unreacted starting materials and by-products.

Other objects will in part be obvious and will in part appear hereinafter.

When used herein, the word "yield," based on any one of the reactants, is the ratio of diacetone acrylamide recovered to diacetone acrylamide expected in view of the amount of that reactant recovered. The "Organic Syntheses yield," or O.S. yield, is the ratio of the amount of diacetone acrylamide actually recovered to the amount expected if the reaction had gone to completion. That is, O.S. yield implies that the reaction has gone to completion while yield based on a reactant implies that all starting material not converted to product has been recovered. Both yields are expressed as percentages. The word "production" is used in a generic sense to refer to either or both yields.

The method of this invention is generally applicable to the preparation of N-3-oxohydrocarbon-substituted acrylamides as defined by the above formula. However, it is particularly suited to the preparation of such compounds where each of $R^{1-5}$ is hydrogen or an alkyl radical, preferably a lower alkyl radical, and $R^6$ is hydrogen or methyl. Desirably, $R^1$, $R^4$ and $R^5$ are lower alkyl radicals and $R^2$ and $R^3$ are hydrogen. More particularly, it is suited to the preparation of diacetone acrylamide. Hereinafter, reference will be made to this compound as the preferred embodiment, but it is to be understood that the method is not so limited but is applicable to all the compounds of this genus.

The method of this invention involves four critical aspects: order of addition, sulfuric acid concentration, mole ratio of sulfuric acid to nitrile, and reaction temperature. Referring to each of these in order, it has initially been found that optimum production is obtained when the sulfuric acid and acrylonitrile are premixed and the diacetone alcohol is added to the mixture thus formed. The effect of this mode of addition on production is noted chiefly at the beginning of the reaction, and is reflected in a higher yield than that obtained by other modes of addition in equal time periods.

As for the sulfuric acid, it is preferred that its concentration be at least about 95% by weight, with the remainder being water. However, a concentration as low as 93% is suitable. If acid of lower concentration is used, the production of diacetone acrylamide is radically decreased.

The mole ratio of sulfuric acid to acrylonitrile is also critical. Again, the major effect is on the percentage of diacetone acrylamide in the reaction mixture in the early stages of the reaction. The ratio should be at least 1.8:1, preferably at least 2:1, and in general need not be more than about 4:1.

Finally, the reaction temperature should be maintained below 30° C., preferably below about 25° C. and most desirably below about 15° C. If the temperature increases above this maximum, the percentage of acrylamide in the product increases substantially.

It is further preferred in the method of this invention that the molar ratio of diacetone alcohol to acrylonitrile be kept relatively low, generally no higher than about 2:1. Usually, the ratio need not be higher than 1:1 and it is frequently advantageous to use even lower ratios, recovering and recycling the unreacted acrylonitrile. If ratios higher than 1:1 are used, the sulfuric acid concentration may also have to be increased so that the mole ratio of sulfuric acid to diacetone alcohol is at least about 2:1.

Following the completion of the reaction carried out as described above, the diacetone acrylamide may be isolated by any of several methods. In a preferred method, the reaction mixture is diluted with water and a suitable organic solvent, typically an aromatic hydrocarbon such as benzene, toluene or xylene, and is then neutralized by the addition of a base such as ammonia or caustic soda. The organic phase, which contains the desired diacetone acrylamide, is separated and volatile materials are stripped. Diacetone acrylamide may then be recovered by any suitable technique. If relatively high-purity material is desired, it may be distilled or recrystallized from an organic solvent such as toluene. The product obtained by distillation may be obtained in flake form, which is very convenient for packaging and shipping.

In the second preferred method for isolating diacetone acrylamide from the reaction mixture, the latter is diluted with water to a sulfuric acid content of about 80% or lower and diacetone acrylamide is extracted by means of a water-immiscible organic solvent. Generally, a sulfuric acid concentration of about 25–60% is convenient; this concentration may be obtained by adding the reaction mixture to the desired quantity of water, with cooling if necessary to avoid an excessive increase in temperature. In general, the temperature during the dilution step should not exceed about 45° C. and should preferably be below about 30° C. Preferred organic solvents for use in this method are aromatic hydrocarbons and chlorinated aliphatic hydrocarbons, examples of which are methylene chloride, chloroform, ethylene dichloride, benzene, toluene and xylene. Chloroform is preferred. When this method is used, it may be advantageous to wash the organic solution with dilute alkali to neutralize whatever acid may remain therein. Also, it is often convenient to dry the organic solution before separating solvent from product. The advantage of this method is that nearly all the by-product acrylamide remains in the aqueous layer when chloroform is used for extraction. If an aromatic hydrocarbon is used, any acrylamide appearing in the organic phase may be removed during the alkali wash by heating the mixture at about 50–100° C., thereby hydrolyzing the acrylamide.

As previously mentioned, the method of this invention produces diacetone acrylamide with a minimum of by-products. The chief contaminants in the product are mesityl oxide and acrylamide; the acrylamide is easily disposed of by either of the isolation methods described hereinabove, while the mesityl oxide may be separated by distillation and, optionally, converted to acetone which may in turn be reconverted to diacetone alcohol for recycle. Also in the product are small amounts of diacetone alcohol and acrylonitrile, which may likewise be recycled.

The method of this invention is illustrated by the following examples. All parts, percentages and proportions are by weight.

EXAMPLE 1

A mixture of 106 parts (2 moles) of acrylonitrile and 510 parts (5 moles) of 96% sulfuric acid is cooled to 0° C. and 232 parts (2 moles) of diacetone alcohol is added over a 16-minute period, with stirring. The temperature rises to 15° C. during the diacetone alcohol addition. It is held below 18° C. by external cooling for 4¼ hours; after that time it is allowed to warm to room temperature as stirring is continued. Samples are removed periodically for analysis; each of these samples is neutralized with 40% aqueous sodium hydroxide and the organic phase is separated and analyzed by vapor phase chromatography. The percentage of diacetone acrylamide in the mixture after various periods of time is given in Table I.

At the end of 21 hours, 500 parts of water is added and the solution is neutralized by the addition of gaseous ammonia. The organic phase is separated and 10 parts of volatile matter is stripped therefrom; this volatile matter it found upon analysis to comprise 75% acrylonitrile and 25% mesityl oxide. The residue is dissolved in toluene and dried over magnesium sulfate, after which it is filtered and the toluene is removed. There is obtained 307 parts of a crude product comprising 87% diacetone acrylamide, 4.9% acrylamide, 3.0% diacetone alcohol, 1% mesityl oxide and 3% toluene. Thus, the overall recovery of diacetone acrylamide is 267 grams, as compared with the theoretical amount of 338 grams. This represents an O.S. yield of 79%. The yield based on acrylonitrile is 85%, and the yield based on diacetone alcohol is 82.1%.

EXAMPLE 2

Acrylonitrile, 106 parts (2 moles), is mixed with 612 parts (6 moles) of 96% sulfuric acid and 174 parts (1.5 moles) of diacetone alcohol is added over a 13-minute period in a temperature range of 19–27° C. The reaction is allowed to proceed for 3¼ hours, after which the reaction vessel is cooled and water (400 parts) is added, followed by sufficient aqueous ammonium hydroxide to neutralize to a pH of 8–9. Toluene, 100 parts, is added and the organic layer is separated. The aqueous layer is extracted with an additional 200 parts of toluene, and finally with a third 100-part portion. The toluene layers are combined and the toluene is stripped, after which the crude product is analyzed. It is found to contain 208.6 parts of diacetone acrylamide, 4.12 parts of acetone, 12.75 parts of acrylonitrile, 26.89 parts of mesityl oxide, 1.33 parts of diacetone alcohol and 10.16 parts of acrylamide. The O.S. yield of diacetone acrylamide is 82.2%, the yield based on acrylonitrile is 73% and the yield based on diacetone alcohol is 83.0%.

EXAMPLE 3

Following the procedure of Example 2, diacetone acrylamide is prepared from 106 parts (2 moles) of acrylonitrile, 612 parts (6 moles) of 96% sulfuric acid and 203 parts (1.75 moles) of diacetone alcohol. The maximum temperature during the reaction is 27° C. The crude product contains 224.3 parts of diacetone acrylamide, 4.95 parts of acetone, 6.39 parts of acrylonitrile, 40.74 parts of mesityl oxide, 2.75 parts of diacetone alcohol and 7.35 parts of acrylamide. The O.S. yield is 75.8%, the yield based on acrylonitrile is 70.6%, and the yield based on diacetone alcohol is 77.0%.

EXAMPLE 4

Each of two reaction vessels is charged with 1968 parts (18.8 moles) of 93% sulfuric acid, which is circulated through a heat exchanger at 10–13° C. Acrylonitrile, 424.5 parts (8.0 moles), is added to each vessel at the same temperature over 30 minutes, followed by 929.5 parts (8.0 moles) of diacetone alcohol over 55 minutes. The mixtures are cooled to 4° C. for 5 minutes and pumped to a surge tank, where they remain for 10 minutes. The combined mixture is then pumped to a neutralization unit where it is diluted with 9450 parts of water and 1390 parts of toluene and neutralized by the addition of 1276 parts of anhydrous ammonia, with cooling to maintain a temperature of 43° C. The organic phase is separated and the toluene, acrylonitrile (297 parts), acetone and water, are removed by distillation through a fractionating column at 65° C./219 mm. The residue from the distillation is charged to a second vessel and fractionated at 91° C./24 mm., which results in removal of diacetone alcohol, mesityl oxide (260 parts) and part of the acrylamide. The residue from the second distillation is charged to an evaporating unit which removes the remainder of the acrylamide and through which diacetone acrylamide is finally recovered by distillation. The distilled diacetone acrylamide (1398 parts) is fed continuously to a belt flaking unit where it is flaked and packaged. The recovered acrylonitrile is recycled.

The following examples, presented for comparison purposes, show the effect on composition of the reaction mixture, conversion and yield of variation in the four limitations (described hereinabove) of the method of this invention.

EXAMPLE 5

Diacetone alcohol, 232 parts (2 moles) and acrylonitrile, 106 parts (2 moles), are charged to a reaction vessel and 565 parts (5 moles) of 85% aqueous sulfuric acid is added at 0–6° C., over 15 minutes. The reaction is allowed to proceed at 26° C. for two hours, after which time a sample is removed and analyzed by vapor phase chromatography as in Example 1. It is found to contain only 10% diacetone acrylamide.

EXAMPLE 6

The procedure of Example 1 is repeated, except that the reaction mixture comprises 212 parts (4 moles) of acrylonitrile, 429 parts (4.2 moles) of 96% sulfuric acid and 232 parts (2 moles) of diacetone alcohol. Samples are withdrawn periodically and analyzed by vapor phase chromatography as in Example 1; the results are given in Table I. The organic layer is separated and analyzed as in Example 1. The volatile phase (112 parts) is found to comprise 90% acrylonitrile and 10% mesityl oxide; the product phase (295 parts) contain 88% diacetone acrylamide and 9.7% acrylamide. Thus, the total recovery of diacetone acrylamide is 260 parts for an O.S. yield of 77%. The yield based on acrylonitrile is 73.5%, and the yield based on diacetone alcohol is 77.0%. The percentage of unconsumed acrylonitrile is substantially higher than in the method of this invention, as shown in Table I.

EXAMPLE 7

To a mixture of 106 parts (2 moles) of acrylonitrile and 232 parts (2 moles) of diacetone alcohol is added 408 parts (4 moles) of 98% sulfuric acid, over 18 minutes with stirring. The temperature of the mixture is maintained below 23° C. as the reaction proceeds over 21 hours, with samples being removed periodically as in Example 1. Based on the vapor phase chromatographic analysis of the final sample, it is estimated that the O.S. yield is 71%, the yield based on acrylonitrile is 81.5% and the yield based on diacetone alcohol is 71%. In addition, substantially more acrylonitrile and mesityl oxide are recovered than in Example 1. The composition of the mixture is shown in Table I.

TABLE I

| Example | Diacetone acrylamide percentage at intervals | | | Product composition, percent | | | |
|---|---|---|---|---|---|---|---|
| | | | | Diacetone acrylamide | Acrylonitrile | Mesityl oxide | Diacetone alcohol |
| 1 | 6 minutes—50.4% | 2 hours—55% | 21 hours—88% | 84.2 | 2.4 | 1.8 | 2.9 |
| 6 | 7 minutes—22% | 2½ hours—27% | 21 hours—54.5% | 63.9 | 24.8 | 2.7 | 0 |
| 7 | 5 minutes—31% | | 21 hours—38% | 71.0 | 4.0 | 21.0 | 0 |

EXAMPLE 8

The procedure of Example 2 is repeated, except that the maximum reaction temperature is 36° C. It is found that 23 parts of acrylonitrile is recovered, as compared with 12.8 parts for Example 2, and 39.1 parts of mesityl oxide is recovered as compared with 26.9 parts for Example 2. The O.S. yield of diacetone acrylamide is 73.5%, the yield based on acrylonitrile is 70.5% and the yield based on diacetone alcohol is 75.0%.

EXAMPLE 9

The procedure of Example 3 is repeated, except that the maximum reaction temperature is 41° C. The recovery of acrylonitrile is 19.8 parts as compared with 6.4 parts for Example 3, and the recovery of mesityl oxide is 48.2 parts as compared with 40.7 parts for Example 3. The O.S. yield of diacetone acrylamide is 70.5%, the yield based on acrylonitrile is 75.9%, and the yield based on diacetone alcohol is 71.9%.

What is claimed is:

1. In a method for the preparation of an N-3-oxohydrocarbon-substituted acrylamide of the formula

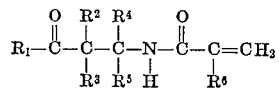

wherein each of $R^1$, $R^2$, $R^3$, $R^4$ and $R^5$ is hydrogen or a hydrocarbon radical and $R^6$ is hydrogen or a lower alkyl radical, which method comprises reacting a nitrile of the formula

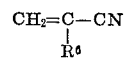

with a 3-oxoalcohol of the formula

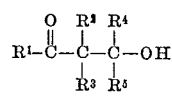

in the presence of sulfuric acid, the improvement which comprises (1) preparing a mixture of said nitrile and sulfuric acid, said sulfuric acid being of at least 93% concentration and the molar ratio of said sulfuric acid to said nitrile being at least 1.8:1; (2) introducing into said mixture the 3-oxoalcohol at a temperature below 30° C., and maintaining said temperature during the reaction of said alcohol with said nitrile; and (3) recovering said N-3-oxohydrocarbon-substituted acrylamide from the reaction mixture.

2. A method according to claim 1 wherein each of $R^1$, $R^2$, $R^3$, $R^4$ and $R^5$ is hydrogen or a lower alkyl radical, and $R^6$ is hydrogen.

3. A method according to claim 2 wherein the N-3-oxohydrocarbon-substituted acrylamide is N - (1,1-dimethyl-3-oxobutyl)acrylamide, the nitrile is acrylonitrile and the 3-oxoalcohol is diacetone alcohol.

4. A method according to claim 3 wherein the molar ratio of diacetone alcohol to acrylonitrile is below about 2:1.

5. A method according to claim 3 wherein the N-(1,1-dimethyl-3-oxobutyl)acrylamide is recovered by diluting the reaction mixture with water and an organic solvent, neutralizing by the addition of a base, separating the organic layer and stripping volatile materials therefrom, and distilling the stripped organic product.

6. A method according to claim 5 wherein the organic solvent is an aromatic hydrocarbon.

7. A method according to claim 6 wherein the aromatic hydrocarbon is toluene.

8. A method according to claim 3 wherein the N-(1,1-dimethyl-3-oxobutyl)acrylamide is recovered by diluting the reaction mixture with water to a sulfuric acid content of about 80% by weight or lower, extracting said N-(1,1-dimethyl-3-oxobutyl)acrylamide from the acidic reaction mixture with a water-immiscible organic solvent, and recovering said N - (1,1-dimethyl-3-oxobutyl)acrylamide from the solution.

9. A method according to claim 8 wherein the organic solvent is an aromatic hydrocarbon or a chlorinated aliphatic hydrocarbon.

10. A method according to claim 9 wherein the organic solvent is chloroform.

References Cited

UNITED STATES PATENTS

| | | | |
|---|---|---|---|
| 3,277,056 | 10/1966 | Coleman | 260—63 |
| 3,425,942 | 2/1969 | Coleman | 252—51.5 |

OTHER REFERENCES

Hackh's Chem. Dict., 4th ed., Julius Grant, McGraw-Hill Book Co., p. 648.

LEWIS GOTTS, Primary Examiner

E. G. LOVE, Assistant Examiner